United States Patent [19]

Porter et al.

[11] Patent Number: 4,483,894
[45] Date of Patent: Nov. 20, 1984

[54] PROCESS FOR APPLYING POLYURETHANE FOAMS TO SUBSTRATES AND PRODUCT MADE THEREBY

[75] Inventors: James R. Porter; Randall C. Jenkines, both of Freeport, Tex.

[73] Assignee: The Dow Chemical Company, Midland, Mich.

[21] Appl. No.: 480,625

[22] Filed: Mar. 30, 1983

Related U.S. Application Data

[63] Continuation-in-part of Ser. No. 276,854, Jun. 24, 1981, abandoned, which is a continuation-in-part of Ser. No. 191,633, Sep. 29, 1980, abandoned.

[51] Int. Cl.$^3$ .......................... B32B 3/26; B05D 5/00
[52] U.S. Cl. ...................................... 428/95; 427/244; 427/373; 428/319.3; 521/112
[58] Field of Search .................. 427/244, 373, 387; 521/112; 428/319.3, 95

[56] References Cited

U.S. PATENT DOCUMENTS

| | | | |
|---|---|---|---|
| 3,629,308 | 12/1971 | Bailey et al. | 260/448.2 |
| 3,836,560 | 9/1974 | Prokai et al. | 556/446 |
| 3,849,156 | 11/1974 | Marlin et al. | 428/85 |
| 3,862,879 | 1/1975 | Barron et al. | 428/95 |
| 3,887,500 | 6/1975 | Prokai et al. | 521/111 |
| 3,895,149 | 7/1975 | Sheffler et al. | 428/94 |
| 3,931,429 | 1/1976 | Austin | 428/158 |
| 3,947,386 | 3/1976 | Prokai et al. | 156/78 X |
| 4,022,941 | 5/1977 | Prokai et al. | 427/358 |
| 4,035,529 | 7/1977 | Meisert et al. | 427/244 |

FOREIGN PATENT DOCUMENTS 1383921 2/1975 United Kingdom .
1573778 8/1980 United Kingdom .

*Primary Examiner*—Evan K. Lawrence
*Attorney, Agent, or Firm*—J. G. Carter

[57] ABSTRACT

Substrates having a backing of fine celled polyurethane foam are prepared by applying to the back of the substrate a frothed polyurethane forming composition containing small amounts of a silicone surfactant having an average molecular weight below about 30,000 which provides the resultant foam with a cell count value of greater than about 16 per 0.0025 square inches and wherein the unfilled, unfrothed liquid components of said polyurethane forming composition obtains a viscosity of greater than 10,000 centipoise in less than 40 minutes at 25° C.

24 Claims, No Drawings

PROCESS FOR APPLYING POLYURETHANE FOAMS TO SUBSTRATES AND PRODUCT MADE THEREBY

CROSS REFERENCE TO RELATED APPLICATION

This application is a continuation-in-part of our co-pending application Ser. No. 276,854, filed June 24, 1981 abandoned, which is a continuation-in-part of application Ser. No. 191,633, filed Sept. 29, 1980, abandoned.

BACKGROUND OF THE INVENTION

The present invention pertains to a process for preparing substrates having a polyurethane backing which process employs applying a frothed polyurethane forming composition to said substrate and to the resultant polyurethane foam backed substrates.

Substrates, particularly carpet substrates, have been backed with polyurethane foam as described in U.S. Pat. Nos. 3,755,212, Dunlap and Parrish; 3,821,130, Barron and Dunlap; and 3,862,879, Barron and Dunlap wherein the frothed polyurethane forming composition does not contain a silicone surfactant and in U.S. Pat. Nos. 3,706,681, Bachura; 3,849,156, Marlin et al; 3,836,560, 3,947,386, 3,957,842, 4,022,722 and 4,022,941, Prokai et al wherein the frothed polyurethane forming compositions contain a silicone surfactant.

The process of the present invention therefore provides for the preparation of frothed polyurethane backed substrates which have fine cells and excellent stability during processing. Furthermore, the process of the present invention incorporates novel low amounts of (a) silicone surfactant(s) (stabilizer), and (b) improved esthetics and cost over the same polyurethane backed substrate without the silicone surfactant (non-stabilized). It is known that penetration weight (weight of the polyurethane composition absorbed by the substrate) is dependent upon several factors, including type of substrate, component reactivity, temperature and component viscosity. Penetration weight on the commercially available carpet described in this invention had at least about 25% reduction compared to non-stabilized formulations. The reduced penetration and improved stability has resulted, on the average, in a 20% improvement in gauge (thickness of foam) over non-stabilized formulations. Cost to the customer has been effectively reduced by the process of this invention because a product (foam backed substrate) is obtained that has the same thickness employing less components by weight. In other terms, the same weight of froth is applied to the back of the substrate and a desirably thicker foam is obtained.

It is well known in the art that the frothing or mechanical whipping operation of the polyurethane forming composition is performed in high shear equipment such as a Hobart mixer, Firestone mixer, Oakes mixer and similar known equipment. The air or other inert gas should be introduced into the polyurethane forming mixture and whipped under pressure in order to obtain a workable froth. The mechanical whipping operation is conducted such that the pressure at the mixer head outlet is in the range from about 85 to about 200 psig, preferably from 85 to 150 psig.

In those processes where there is no silicone surfactant present, the substrates absorb an inordinate amount of polyurethane forming components thereby resulting in too much absorption beyond what is necessary for tuftbinding. A loss of gauge and a destabilization line at the substrate/foam interface occurs, wherein the cell structure becomes coarse and unappealing. The loss of gauge and destabilization line are esthetically unappealing to the buyer and results in higher costs to the vendor. The solution to this without a silicone is a high catalyst level or quick reaction time, which severely limits processing latitude.

In those processes wherein a silicone surfactant is employed, large quantities of the silicone surfactant are required in order to obtain fine cells or else stability of the polyurethane forming froth is not sufficient to give a fine celled foam or prevent an inordinate amount of penetration (absorption). In the present invention, a large quantity of surfactant ($>0.5$ part) limits the processing of the froth because froth viscosity is too high to be adequately processed onto the back of a substrate such as a carpet and the pressure in the mixer head may exceed the working limit of 200 psig. Also, in the present invention, the improvement in penetration and gauge is no longer measurable from greater than about 0.3 parts surfactant. There is no real advantage, therefore, to using surfactant levels above about 0.5 parts from a processing or cost standpoint.

SUMMARY OF THE INVENTION

The present invention is directed to a process for preparing substrates having a fine celled polyurethane foam backing containing an inorganic filler or mixture of such fillers, which process comprises applying to the back of the said substrate and subsequently curing a frothed polyurethane composition containing (A) a relatively high molecular weight polyether polyol having an average of from 2 to about 8, preferably from about 2 to about 3 hydroxyl groups per molecule and an average hydroxyl equivalent weight of from about 100 to about 3000, preferably from about 500 to about 2500 or a mixture of such polyols;

(B) a relatively low molecular weight polyol having an average of from about 2 to about 8, preferably from about 2 to about 3 hydroxyl groups per molecule and an average equivalent weight of from about 31 to about 230, preferably from about 31 to about 200 or a mixture of such polyols;

(C) an organic polyisocyanate or polyisothiocyanate having an average of from about 2 to about 4 NCX (each X being independently O or S) groups per molecule or a mixture of such isocyanates or isothiocyanates (D) at least one inorganic filler;

(E) at least one catalyst for effecting the reaction between components (A), (B) and (C); and (F) at least one silicone surfactant which is a poly(dimethyl)siloxane polyoxyalkylene copolymer having an average molecular weight of less than about 30,000 and wherein at least about 60 percent by weight of the polyoxyalkylene groups are oxyethylene groups and the dimethylsiloxane content of the polymer is from about 15 percent to about 40 percent by weight and at least about 40 percent by weight of the polymer is derived from the oxyethylene groups;

wherein:

(1) components (A) and (B) are employed in a ratio which provides from about 50 to about 95 parts by weight of component (A) and from about 50 to about 5 parts by weight of component (B) based on 100 parts by weight for the total quantity of components (A) and (B) with the proviso
(i) that the equivalent weight of (A) is at least 1.5, preferably at least 10 times greater than the equivalent weight of (B);
(ii) that when component (A) has an average functionality of from 2 to about 8, preferably from 2 to about 3, and an OH equivalent weight of from about 1000 to about 3000, preferably from about 1500 to about 2500, and either (a) an end cap of at least two moles of ethylene oxide per active hydrogen atom or (b) an internal block of at least three moles of ethylene oxide residues per active hydrogen atom, then component (B) need not be present; and
(iii) that a mixture of components (A) and (B) or component (A) when employed alone has a Brookfield viscosity employing a No. 2 spindle at 12 rpm of at least about 100, preferably at least about 250, centipoise at 25° C.;
(2) components (A), (B) and (C) are employed in quantities so as to provide an NCX:OH ratio of from about 0.85:1 to about 2.0:1, preferably from about 1.0:1 to about 1.2:1;
(3) component (E) is employed such that an unfrothed mixture of the unfilled urethane forming components (A), (B), (C), (E) and (F) obtains a viscosity of greater than about 10,000 centipoise at 25° C.±0.5° C. in less than about 40 minutes; and
(4) component (F) is present in a quantity of from about 0.02 to about 0.5 parts per 100 parts by weight of the combined weight of components (A) and (B) and is of such composition and quantity so as to provide the foam with a cell count of greater than 16 per 0.0025 square inches (0.016 cm$^2$) at a position approximately midway between the substrate-foam interface and the outer edge of the foam.

The present invention is also directed to a process for preparing substrates having a fine celled polyurethane foam backing containing an inorganic filler or mixture of such fillers, which process comprises applying to the back of the said substrate and subsequently curing a frothed polyurethane composition containing (A) a relatively high molecular weight polyether polyol having an average of from 2 to about 8, preferably from about 2 to about 3 hydroxyl groups per molecule and an average hydroxyl equivalent weight of from about 100 to about 3000, preferably from about 500 to about 2500 or a mixture of such polyols;

(B) a relatively low molecular weight polyol having an average of from about 2 to about 8, preferably from about 2 to about 3 hydroxyl groups per molecule and an average equivalent weight of from about 31 to about 230, preferably from about 31 to about 200 or a mixture of such polyols;

(C) an organic polyisocyanate or polyisothiocyanate having an average of from about 2 to about 4 NCX (each X being independently O or S) groups per molecule or a mixture of such isocyanates or isothiocyanates (D) at least one inorganic filler;

(E) at least one catalyst for effecting the reaction between components (A), (B) and (C); and (F) a silicone surfactant, having an average molecular weight below about 30,000 or mixture thereof; wherein:

(1) components (A) and (B) are employed in a ratio which provides from about 50 to about 95 parts by weight of component (A) and from about 50 to about 5 parts by weight of component (B) based on 100 parts by weight for the total quantity of components (A) and (B) with the proviso
(i) that the equivalent weight of (A) is at least 1.5, preferably at least 10 times greater than the equivalent weight of (B);
(ii) that when component (A) has an average functionality of from 2 to about 8, preferably from 2 to about 3, and an OH equivalent weight of from about 1000 to about 3000, preferably from about 1500 to about 2500, and either (a) an end cap of at least two moles of ethylene oxide per active hydrogen atom or (b) an internal block of at least three moles of ethylene oxide residues per active hydrogen atom, then component (B) need not be present; and
(iii) that a mixture of components (A) and (B) or component (A) when employed alone has a Brookfield viscosity employing a No. 2 spindle at 12 rpm of at least about 100, preferably at least about 250, centipoise at 25° C.;
(2) components (A), (B) and (C) are employed in quantities so as to provide an NCX:OH ratio of from about 0.85:1 to about 2.0:1, preferably from about 1.0:1 to about 1.2:1;
(3) component (E) is employed such that an unfrothed mixture of the unfilled urethane forming components (A), (B), (C), (E) and (F) obtains a viscosity of greater than about 10,000 centipoise at 25° C.±0.5° C. in less than about 40 minutes; and
(4) component (F) is present in a quantity of from about 0.02 to about 0.5 parts per 100 parts by weight of the combined weight of components (A) and (B) and is of such composition and quantity so as to provide the foam with a cell count of greater than 16 per 0.0025 square inches (0.016 cm$^2$) at a position approximately midway between the substrate-foam interface and the outer edge of the foam.

The cell count should be compared at comparable densities, preferably at densities below about 13 lbs/fts$^3$ (0.2 g/cc).

The present invention is also directed to a product produced by the process of the invention.

DETAILED DESCRIPTION OF THE INVENTION

Suitable relatively high molecular weight polyether polyols which can be employed in the present invention include adducts of one or more compounds containing 2 to 8 hydroxyl groups per molecule and one or more hydrocarbylene or halogen substituted hydrocarbylene oxides.

Suitable hydroxyl containing compounds include those having from about 2 to about 20, preferably from about 2 to about 6 carbon atoms such as, for example, water, ethylene glycol, diethylene glycol, propylene glycol, 1,2-butane diol, 1,3-butane diol, 1,4-butane diol, glycerine, trimethylol propane, p,p'-isopropylidine diphenol, mixtures thereof and the like.

Suitable hydrocarbylene or halogen substituted hydrocarbylene oxides which can be employed to prepare polyether polyols include those having from 2 to about 12, preferably from 2 to about 4 carbon atoms such as, for example, ethylene oxide, propylene oxide, 1,2-butylene oxide, 2,3-butylene oxide, styrene oxide, epichlorohydrin, epibromohydrin, 3-methyl-1,2-butylene oxide, 3,3,-dimethyl-1,2-butylene oxide, mixtures thereof and the like.

Other relatively high molecular weight polyols which can be employed herein include polymer-containing polyols such as, for example, those disclosed in U.S. Pat. Nos. Re. 29,118 (Stamberger), Re. 28,715 (Stamberger), Re. 29,014 (Pizzini et al) and 3,869,413 (Blankenship et al) all of which are incorporated herein by reference.

Suitable low molecular weight polyols include, for example, ethylene glycol, propylene glycol, 1,3-propane diol, 1,4-butane diol, dipropylene glycol, diethylene glycol, triethylene glycol, tetraethylene glycol, tripropylene glycol, tetrapropylene glycol, heptapropylene glycol, mixtures thereof and the like.

Also suitable as low molecular weight polyols are adducts of initiator compounds having from 2 to about 8 active hydrogen atoms per molecule and a hydrocarbylene oxide as hereinbefore described so long as the resultant adduct has the desired equivalent weight for the low equivalent weight polyol.

Particularly suitable initiator compounds include, for example, water, ethylene glycol, propylene glycol, glycerine, trimethylol propane, aniline, ammonia, ethylene diamine, diethylenetriamine, aminoethylethanolamine, pentaerythritol, glucose, fructose, sucrose, sorbitol, mixtures thereof and the like.

When adducts of initiator compounds having more than about 8 active hydrogen atoms per molecule are employed, they must be employed in admixture with polyols having less than about 8 hydroxyl groups per molecule in quantities so as to result in an average of from 2 to about 8 hydroxyl groups per molecule.

When the viscosity of a mixture of polyol components (A) and (B) or the viscosity of polyol (A) when employed alone is below about 100, the resultant filled, foam-forming system is too fluid to froth adequately and does not result in a fine celled, low density foam.

Suitable organic polyisocyanates include, for example, 2,4-toluenediisocyanate, 2,6-toluenediisocyanate, xylylenediisocyanate, p,p'-diphenylmethanediisocyanate, p-phenylenediisocyanate, naphthalenediisocyanate, dianisodine diisocyanate, polymethylene polyphenylisocyanate, hexamethylene diisocyanate, mixtures thereof and the like.

Also suitable are the isocyanate terminated prepolymers prepared from one or more of the above mentioned polyisocyanates and one or more of the above mentioned polyols.

Suitable also are the trimerized diisocyanates and crude diisocyanates.

Also suitable are the corresponding polyisothiocyanates, including isothiocyanate terminated prepolymers.

Suitable catalysts which can be employed include, for example, tertiary amines, organometallic compounds, particularly metal carboxylates, mixtures thereof and the like.

Particularly suitable catalysts include, for example, di-n-butyl tin-bis(mercaptoacetic acid isooctyl ester), dimethyl tin dilaurate, dibutyl tin dilaurate, stannous octoate, lead octoate, triethylene diamine, N-methyl morpholine, mixtures thereof and the like.

Suitable inorganic filler materials which can be employed herein include, for example, calcium carbonate, alumina trihydrate, talc, bentonite, antimony trioxide, kaolin, barytes either as obtained or treated with fatty acids or organotitanates, mixtures thereof and the like.

The inorganic filler is usually employed in quantities of from about 25 to about 300, preferably from about 50 to about 200 parts per 100 parts by weight based on the total polyol composition.

Suitable silicone surfactants which can be employed herein include the branched organosilicon polyglycol block copolymers having an average molecular weight below about 30,000. Such surfactants are described in U.S. Pat. No. 3,518,288, Haluska.

Particularly suitable are DC193 and DC197 commercially available from Dow Corning Corporation; and L5430 commercially available from Union Carbide Corporation.

Particularly suitable silicone surfactants are the poly(dimethyl)siloxane polyoxyalkylene copolymers having a weight average molecular weight of less than about 30,000, preferably less than about 10,000. Such surfactants also preferably have a dimethyl siloxane content of from about 15% to about 40% by weight of the total polymer and an oxyethylene content of greater than about 60, most preferably about 100 weight percent of the polyoxyalkylene glycol moiety and an oxyethylene content greater than about 40% of the total surfactant polymer.

Particularly suitable silicone surfactants are those represented by the formula

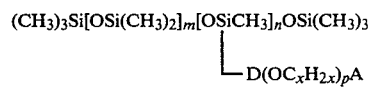

wherein m has a value of from about 6 to about 180, preferably from about 6 to about 60, most preferably from about 11 to about 20; n has a value of from about 3 to about 30, preferably from about 3 to about 10, most preferably from about 3 to about 5; each x is independently 2, 3 or 4 with the proviso that in at least 60, preferably 100 percent of the $(OC_xH_{2x})$ groups, x has a value of 2; p has a value of from about 9 to about 30, preferably from about 9 to about 20, most preferably from about 9 to about 12; and A represents a group selected from

(acyloxy) especially where R is methyl,

(carbonate ester),

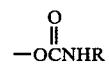

(urethane), —OH (hydroxyl), or —R (alkyl) especially methyl; and D is an alkylene radical containing from about 3 to about 18 carbon atoms where D is most preferably a propylene radical. These are disclosed by Haluska in U.S. Pat. No. 3,518,288 and Bachura in U.S. Pat. No. 3,706,681 both of which are incorporated herein by reference.

If desired, the formulations can contain flame suppressing agents such as, for example, dibromoneopentyl glycol, tris(dichloropropyl) phosphate, polyammonium phosphate, beta-chloroethyl phosphonate ester, chlorophosphate ester, polyvinylidene chloride, mixtures thereof and the like.

Suitable substrates to which the frothed compositions of the present invention are applied include carpet, particularly tufted carpet, paper, synthetic and natural textile fabrics such as, for example, nylon, polyester, acrylic, cotton, wool and the like.

Suitable primary backing materials which can be employed in the present invention when the substrate is a tufted carpet include those prepared from, for example, jute, polypropylene, nylon, polyesters, polyacrylates and the like.

Suitable yarns which can be tufted or woven into the primary backing include those prepared from, for example, wool, nylon, polyester, acrylic, cotton, polypropylene, polyethylene, blends thereof and the like.

The following examples are illustrative of the present invention but are not to be construed as to limiting the scope thereof in any manner.

GENERAL PROCEDURE

In the examples and comparative experiments, a master batch containing a polyol mixture, filler(s) and silicon surfactant was well blended to form a homogeneous creamy dispersion and placed in a run tank maintained at a temperature not less than about 45° F. (7° C.) under a pad of nitrogen. Another run tank containing the polyisocyanate was maintained at a temperature not less than about 60° F. (15.5° C.). The contents of the run tanks, and catalyst were metered into an Oakes frother where the contents were frothed employing air as the inert gas. The resultant froth was then placed onto the back of the carpet via a hose and doctored to the desired thickness. The froth exit temperature was maintained at a temperature of at least about 86° F. (30° C.).

The carpet containing the polyurethane-forming froth composition was then cured in an oven at a temperature of about 250° F. (121° C.).

The carpet onto which the frothed polyurethane-forming compositions were doctored was a flat level loop carpet containing 100% continuous filament nylon pile weighing 14 oz/yd$^2$ tufted at a guage of 0.1 inch through an FLW (woven polypropylene needlepunched with nylon or polypropylene fiber) primary backing weighing 4.25 oz/yd$^2$ at a stitch rate of 8 per inch and a pile height of 0.125 inch.

In the following examples and comparative experiments, the properties were determined by the following tests.

The viscosity of the unfilled urethane forming components is obtained by mixing the components for 3 minute(s) and placing 10 ml. of the resultant mixture in a Brookfield LVF Viscometer, maintaining the temperature of the mixture at 25° C.±0.5° C. and determining the viscosity over the desired period of time. The Brookfield LVF Viscometer was employed using a number four spindle rotating at thirty rpm.

The viscosity of a mixture of polyols (A) and (B) or the viscosity of polyol (A) when employed alone is obtained by placing 200 ml of the mixture of polyols (A) and (B) or polyol (A) alone in a Brookfield LVF Viscometer, maintaining the temperature of the material being measured at 25° C.,±0.5° C., and determining the viscosity employing a number 2 spindle rotating at 12 rpm.

Penetration weight was calculated by subtracting the greige weight (the weight of the carpet sample to which the polyurethane-forming froth composition was applied so as to provide a secondary backing), from the greige weight plus polyurethane-forming materials which had soaked into the tufts and primary backing which was the weight of the sample after "skiving" the foam from the back of the carpet sample and brushing with a wire brush to remove as much of the remaining foam as possible.

The cell count was determined employing a microscope equipped with a Polaroid camera to take photomicrographs of foam and visually count the number of cells along the surface plane in a given area. Each area was ten units by ten units, each unit being 0.005 inches (0.0025 in.$^2$). The pictures were taken of the foam surface at or near the center of the foam after splitting the foam for this purpose. The surface plane after splitting was dyed so that individual cells were clearly visible.

The foam density was determined by the following formula:

$$0.08333 \times \frac{\text{coating weight} - \text{penetration wt. (oz/yd}^2)}{\text{Gauge, (inches)}} = \text{density, lb/ft}^3$$

The coating weight was obtained by subtracting the greige weight from the total sample weight of the carpet (greige) and foam.

Gauge is the thickness of the foam on the back of the carpet and was measured after the carpet with the foam had been cured.

The following components were employed in the examples and comparative experiments.

Polyol A is a glycerine initiated polyoxypropylene glycol end capped with about 15 weight percent ethylene oxide. The resultant primary hydroxyl-containing polyether polyol had an average OH equivalent weight of about 1650.

Polyol B is diethylene glycol having an average OH equivalent weight of about 53.

Polyol C is a polyoxyethylene glycol having an average OH equivalent weight of about 100.

Polyol D is a glycerine initiated polyoxypropylene glycol having an average OH equivalent weight of about 87.

Polyol E is a glycerine initiated heteropolyol prepared from a mixture of propylene oxide and ethylene oxide in a ratio of about 88/12 weight percent respectively. The resultant secondary hydroxyl-containing polyether polyol has an average OH equivalent weight of about 1270.

Polyol F is dipropylene glycol having an average OH equivalent weight of about 67.

Polyol G is a polyoxypropylene glycol having an average equivalent weight of about 1000.

Polyol H is a polyoxypropylene triol containing about 20 weight percent of a 50/50 styrene/acrylonitrile copolymer and having an average equivalent weight of about 2000.

Polyol I is an adduct of a mixture of sucrose and glycerine with propylene oxide having an average functionality of about 4.6 and an equivalent weight of about 130.

Polyol J is a glycerine initiated polyoxypropylene triol having an OH equivalent weight of about 240.

Polyisocyanate A is an 80/20 mixture of 2,4-/2,6-toluene diisocyanate having an average NCO equivalent weight of about 87.

Polyisocyanate B is prepolymer prepared by reacting an excess of polyisocyanate A with a polyol mixture consisting of 64 weight percent of polyol C and 36 weight percent polyol D. The resultant isocyanate-containing prepolymer had an NCO content of about 26.7% and an average NCO equivalent weight of about 157.

Polyisocyanate C is a carbodiimide modified methylene diphenyldiisocyanate having an NCO equivalent weight of about 143 commercially available from Upjohn Company as ISONATE 143L.

Catalyst A is di-n-butyl tin bis(isooctylmercaptoacetate), commercially available from Witco Chemical Co. as Fomrez UL-6.

Catalyst B is dimethyl tin dilaurate commercially available from Witco Chemical Co. as Fomrez UL-28.

Filler A is alumina trihydrate commercially available from Kaiser Aluminum Company as H36U.

Filler B is calcium carbonate commercailly available from Georgia Marble Company as D-70.

Silicone A is a nonhydrolyzable poly(dimethyl siloxane) polyoxyethylene copolymer having a weight average molecular weight of about 4000 commercially available from Dow Corning Corporation as DC-197.

Silicone B is a 40 percent by weight solution of a linear siloxane-polyoxyalkylene block copolymer having a weight average molecular weight of about 100,000 in a hydrocarbon solvent commercially available from Union Carbide Corporation as L 5614.

Silicone C is a siloxane-polyoxyalkylene block copolymer having a weight average molecular weight of about 40,000, commercially available from Th. Goldschmidt as B 1651. It is a 55% wt. solution in an aromatic hydrocarbon solvent.

Silicone D is a hydrolyzable polysiloxane surfactant having a weight average molecular weight of about 4,000, commercially available from Th. Goldschmidt as B 1048.

Silicone E is a nonhydrolyzable methyl capped siloxanepolyoxyalkylene block copolymer having a weight average molecular weight of about 3,000, commercially available from Union Carbide Corporation as L 5340.

Silicone F is a non-hydrolyzable silicone surfactant having a weight average molecular weight of about 15,000 commercailly available from Dow Corning Corporation as DC 190.

Silicone G is a silicone surfactant believed to be diluted in a polyoxyalkylene glycol and is commercially available from Union Carbide Corporation as L 5303.

EXAMPLE 1

The general procedure was employed with the following components to prepare a polyurethane foam backed carpet.

90 pbw (parts by weight) Polyol A
10 pbw Polyol B
40 pbw Filler A
40 pbw Filler B
0.25 pbw Silicone A
46.1 pbw Polyisocyanate B
0.06 pbw Catalyst A
The NCO/OH ratio was 1.2/1.
The following results were observed.

The penetration weight was 6 oz./yd$^2$.
The cell count was 35 cells per area.
The foam density was 11.9 lb/ft$^3$.
The gauge was 0.333 inches.
The coating weight was 54 oz/yd$^2$.
The polyol viscosity was 680 centipoise (cp)
Viscosity of liquid polyurethane forming components was 10,600 cp at 16 min.

COMPARATIVE EXPERIMENT A

Example 1 was repeated without any silicone surfactant with the following results being observed.

The penetration weight was 16 oz./yd$^2$.
The cell count was 26 cells per area.
The foam density was 10.3 lb/ft$^3$.
The gauge was 0.235 in.
The coating weight was 45 oz/yd$^2$.

COMPARATIVE EXPERIMENT B

Example 1 was repeated except that 0.56 parts of Silicone B was employed instead of 0.25 parts of Silicone A. The following results were observed.

The viscosity of the liquid polyurethane-forming components was 12,800 cp at 16 min.
The coating weight was 50 oz./yd$^2$.
The gauge was 0.306 inches.
The penetration weight was 5 oz./yd$^2$.
The cell count was 16 cells per area.
The foam density was 12.1 lb/ft$^3$.

EXAMPLE 2

Example 1 was repeated employing 0.05 pbw of Silicone A instead of 0.25 pbw with the following results being observed.

The viscosity of the liquid polyurethane-forming components was 10,600 cp at 16 min.
The coating weight was 46 oz./yd$^2$.
The penetration weight was 10 oz./yd$^2$.
The gauge was 0.271 inches.
The cell count was 17 cells per area.
The foam density was 11.1 lb/ft$^3$.

EXAMPLE 3

Example 1 was repeated employing 0.11 pbw of Silicone A instead of 0.25 pbw with the following results being observed.

The viscosity of the liquid polyurethane-forming components was 11,000 cp at 15 min.
The coating weight was 48 oz./yd$^2$.
The penetration weight was 8 oz./yd$^2$.
The gauge was 0.294 inches.
The cell count was 17 cells per area.
The foam density was 11.2 lb/ft$^3$.

EXAMPLE 4

Example 2 was repeated employing 0.56 pbw of Silicone A instead of 0.25 pbw with the following results being observed.

The viscosity of the liquid polyurethane-forming components was 10,800 cp at 18 min.
The coating weight was 48 oz./yd$^2$.
The penetration weight was about 5 oz./yd$^2$.
The gauge was 0.302 inches.

The cell count was 43 cells per area.
The foam density was 12.0 lb/ft³.

COMPARATIVE EXPERIMENT C

The general procedure was followed employing the following composition.

90 pbw Polyol A
10 pbw Polyol B
46.1 pbw Polyisocyanate B
55 pbw Filler A
0.07 pbw Catalyst A
0.05 pbw Silicone F
The NCO/OH ratio was 1.2/1.
The following results were observed.

The viscosity of the liquid polyurethane-forming components was 11,500 cp at 16 min.
The coating weight was 42 oz./yd².
The penetration weight was 11 oz./yd².
The gauge was 0.228 inches.
The cell count was 15 cells per area.
The foam density was 11.5 lb/ft³.
The polyol viscosity was 680 cp.

EXAMPLE 5

Comparative Experiment C was repeated employing 0.15 of Silicone F instead of 0.05 pbw of Silicone F, with the following results being observed.

The viscosity of the liquid polyurethane-forming components was 10,500 cp at 15 min.
The coating weight was 48 oz./yd².
The penetration weight was 8 oz./yd².
The gauge was 0.303 inches.
The cell count was 19 cells per area.
The foam density was 11.0 lb/ft³.

EXAMPLE 6

Comparative Experiment C was repeated employing 0.56 pbw of Silicone F instead of 0.05 pbw of Silicone F, with the following results being observed.

The viscosity of the liquid polyurethane-forming components was 10,500 cp at 15 min.
The coating weight was 43 oz./yd².
The penetration weight was 6 oz./yd².
The gauge was 0.293 inches.
The cell count was 35 cells per area.
The foam density was 10.7 lb/ft³.

COMPARATIVE EXPERIMENT D

Example 1 was repeated employed 0.05 parts of Silioone B instead of 0.25 parts of silicone A with the following results being observed.

The viscosity of the liquid polyurethane-forming components was 11,500 cp at 16 min.
The coating weight was 47 oz./yd².
The penetration weight was 14 oz./yd².
The gauge was 0.245 inches.
The cell count was 8 cells per area.
The foam density was 11.1 lb/ft³.

COMPARATIVE EXPERIMENT E

Example 1 was repeated employing 0.11 pbw of Silicone B instead of 0.25 pbw of Silicone A with the following results being observed.

The viscosity of the liquid polyurethane-forming components was 12,000 cp at 16 min.
The coating weight was 48 oz./yd².
The penetration weight was 14 oz./yd².
The gauge was 0.224 inches.
The cell count was 2 cells per area.
The foam density was 12.9 lb/ft³.

COMPARATIVE EXPERIMENT F

Example 1 was repeated employing 0.25 pbw Silicone B instead of 0.25 pbw of Silicone A with the following results being observed.

The viscosity of the liquid polyurethane-forming components was 11,500 cp at 15 min.
The coating weight was 51 oz./yd².
The penetration weight was 8 oz./yd².
The gauge was 0.290 inches.
The cell count was 6 cells per area.
The foam density was 12.3 lb/ft³.

COMPARATIVE EXPERIMENT G

Comparative Experiment C was repeated except that no silicone surfactant was employed and the catalyst level was 0.06 pbw instead of 0.07 pbw. The following results were observed.

The viscosity of the liquid polyurethane-forming components was 10,600 cp at 16 min.
The coating weight was 48 oz./yd².
The penetration weight was 17 oz./yd².
The gauge was 0.271 inches.
The cell count was 26 cells per area.
The foam density was 9.4 lb/ft³.

EXAMPLE 7

Comparative Experiment C was repeated employing 0.05 pbw of Silicone A instead of 0.05 pbw of Silicone F, with the following results being observed.

The viscosity of the liquid polyurethane-forming components was 10,600 cp at 16 min.
The coating weight was 48 oz./yd².
The penetration weight was 9 oz./yd².
The gauge was 0.293 inches.
The cell count was 24 cells per area.
The foam density was 10.9 lb/ft³.

EXAMPLE 8

Comparative Experiment C was repeated employing 0.11 pbw of Silicone A instead of 0.05 pbw of Silicone F, with the following results being observed.

The viscosity of the liquid polyurethane-forming components was 11,000 cp at 15 min.
The coating weight was 48 oz./yd².
The penetration weight was 7 oz./yd².
The gauge was 0.318 inches.
The cell count was 31 cells per area.
The foam density was 10.7 lb/ft³.

COMPARATIVE EXPERIMENT H

Comparative Experiment C was repeated except that 0.05 pbw Silicone C was employed instead of 0.05 pbw of Silicone F with the following results.

The viscosity of the liquid polyurethane-forming components was 11,500 cp at 16 min.
The coating weight was 46 oz./yd$^2$.
The penetration weight was 15 oz./yd$^2$.
The gauge was 0.248 inches.
The cell count was 7 cells per area.
The foam density was 10.4 lb/ft$^3$.

COMPARATIVE EXPERIMENT I

Comparative Experiment C was repeated employing 0.15 pbw Silicone C instead of 0.05 pbw Silicone F with the following results being observed.

The viscosity of the liquid polyurethane-forming components was 11,000 cp at 16 min.
The coating weight was 43 oz./yd$^2$.
The penetration weight was 11 oz./yd$^2$.
The gauge was 0.277 inches.
The cell count was 13 cells per area.
The foam density was 9.6 lb/ft$^3$.

COMPARATIVE EXPERIMENT J

Comparative Experiment C was repeated employing 0.56 pbw of Silicone C instead of 0.05 pbw of Silicone F with the following results being observed.

The viscosity of the liquid polyurethane-forming components was 13,000 cp at 19 min.
The coating weight was 47 oz./yd$^2$.
The penetration weight was 9 oz./yd$^2$.
The gauge was 0.306 inches.
The cell count was 10 cells per area.
The foam density was 10.3 lb/ft$^3$.

COMPARATIVE EXPERIMENT K

Comparative Experiment C was repeated employing 0.056 pbw of Silicone D instead of 0.05 pbw of Silicone F with the following results being observed.

The viscosity of the liquid polyurethane-forming components was 11,500 cp at 16 min.
The coating weight was 45 oz./yd$^2$.
The penetration weight was 11 oz./yd$^2$.
The gauge was 0.267 inches.
The cell count was 12 cells per area.
The foam density was 10.8 lb/ft$^3$.

EXAMPLE 9

Comparative Experiment K was repeated employing 0.15 pbw of Silicone D instead of 0.056 pbw of Silicone D with the following results being observed.

The viscosity of the liquid polyurethane-forming components was 11,000 cp at 16 min.
The coating weight was 51 oz./yd$^2$.
The penetration weight was 9 oz./yd$^2$.
The gauge was 0.303 inches.
The cell count was 18 cells per area.
The foam density was 11.6 lb/ft$^3$.

EXAMPLE 10

Comparative Experiment K was repeated employing 0.56 pbw of Silicone D instead of 0.056 pbw of Silicone D with the following results being observed.

The viscosity of the liquid polyurethane-forming components was 11,000 cp at 18 min.
The coating weight was 52 oz./yd$^2$.
The penetration weight was 6 oz./yd$^2$.
The gauge was 0.330 inches.
The cell count was 31 cells per area.
The foam density was 11.7 lb/ft$^3$.

COMPARATIVE EXPERIMENT L

Comparative Experiment C was repeated employing 0.05 pbw of Silicone E instead of 0.05 pbw of Silicone F with the following results being observed.

The viscosity of the liquid polyurethane-forming components was 11,000 cp at 16 min.
The coating weight was 49 oz./yd$^2$.
The penetration weight was 11 oz./yd$^2$.
The gauge was 0.294 inches.
The cell count was 16 cells per area.
The foam density was 11.0 lb/ft$^3$.

EXAMPLE 11

Comparative Experiment L was repeated employing 0.15 pbw of Silicone E instead of 0.05 pbw of Silicone E with the following results being observed.

The viscosity of the liquid polyurethane-forming components was 10,500 cp at 15 min.
The coating weight was 47 oz./yd$^2$.
The penetration weight was 6 oz./yd$^2$.
The gauge was 0.312 inches.
The cell count was 29 cells per area.
The foam density was 11.0 lb/ft$^3$.

EXAMPLE 12

Comparative Experiment L was repeated employing 0.56 pbw of Silicone E instead of 0.15 pbw of Silicone E with the following results being observed.

The viscosity of the liquid polyurethane-forming components was 10,800 cp at 15 min.
The coating weight was 48 oz./yd$^2$.
The penetration weight was 5 oz./yd$^2$.
The gauge was 0.342 inches.
The cell count was 38 cells per area.
The foam density was 10.4 lb/ft$^3$.

EXAMPLE 13

Comparative Experiment C was repeated employing 0.05 pbw of Silicone G instead of 0.05 pbw of Silicone F with the following results being observed.

The viscosity of the liquid polyurethane-forming components was 10,600 cp at 16 min.
The coating weight was 43 oz./yd$^2$.
The penetration weight was 18 oz./yd$^2$.
The gauge was 0.228 inches.
The cell count was 23 cells per area.
The foam density was 9.2 lb/ft$^3$.

EXAMPLE 14

Comparative Experiment C was repeated employing 0.15 pbw of Silicone G instead of 0.05 pbw of Silicone F with the following results being observed.

The viscosity of the liquid polyurethane-forming components was 11,000 cp at 16 min.
The coating weight was 45 oz./yd$^2$.
The penetration weight was 16 oz./yd$^2$.
The gauge was 0.205 inches.
The cell count was 18 cells per area.

The foam density was 12.0 lb/ft$^3$.

COMPARATIVE EXPERIMENT M

Comparative Experiment C was repeated employing 0.56 pbw of Silicone G instead of 0.05 pbw of Silicone F with the following results being observed.

The viscosity of the liquid polyurethane-forming components was 10,600 cp at 18 min.
The coating weight was 47 oz./yd$^2$.
The penetration weight was 15 oz./yd$^2$.
The gauge was 0.263 inches.
The cell count was 11 cells per area.
The foam density was 9.9 lb/ft$^3$.

EXAMPLE 15

The general procedure was followed employing the following composition.

88 pbw Polyol E
12 pbw Polyol F
46.1 pbw Polyisocyanate B
55 pbw Filler A
0.25 pbw Catalyst B
0.10 pbw Silicone A
The NCO/OH ratio was 1.2/1.
The following results were observed.

The viscosity of the liquid polyurethane-forming components was 10,400 cp at 13 min.
The coating weight was 43 oz./yd$^2$.
The penetration weight was 6 oz./yd$^2$.
The gauge was 0.291 inches.
The cell count was 27 cells per area.
The foam density was 10.4 lb/ft$^3$.
The polyol viscosity was 500 cp.

EXAMPLE 16

Example 15 was repeated employing 0.05 of Silicone A instead of 0.25 pbw of Silicone A, with the following results being observed.

The viscosity of the liquid polyurethane-forming components was 10,600 cp at 14 min.
The coating weight was 45 oz./yd$^2$.
The penetration weight was 11 oz./yd$^2$.
The gauge was 0.261 inches.
The cell count was 17 cells per area.
The foam density was 11.0 lb/ft$^3$.

EXAMPLE 17

The general procedure was followed employing the following composition.

85 pbw Polyol G
15 pbw Polyol F
60 pbw Polyisocyanate B
55 pbw Filler A
0.07 pbw Catalyst B
0.25 pbw Silicone A
The NCO/OH ratio was 1.2/1.
The following results were observed.

The viscosity of the liquid polyurethane-forming components was 10,000 cp at 8 min.
The coating weight was 46 oz./yd$^2$.
The penetration weight was 10 oz./yd$^2$.
The gauge was 0.264 inches.
The cell count was 17 cells per area.
The foam density was 11.2 lb/ft$^3$.
The polyol viscosity was 245 cp.

EXAMPLE 18

The general procedure was followed employing the following composition.
90 pbw Polyol A
10 pbw Polyol B
41.5 pbw Polyisocyanate C
55 pbw Filler A
0.01 pbw Catalyst A
0.15 pbw Silicone A
The NCO/OH ratio was 1.2/1.
The following results were observed.

The viscosity of the liquid polyurethane-forming components was 10,000 cp at 2 min.
The coating weight was 47 oz./yd$^2$.
The penetration weight was 6.3 oz./yd$^2$.
The gauge was 0.264 inches.
The cell count was 35 cells per area.
The foam density was 12.8 lb/ft$^3$.

EXAMPLE 19

The general procedure was followed employing the following composition.
90 pbw Polyol A
10 pbw Polyol B
25.3 pbw Polyisocyanate A
55 pbw Filler A
0.07 pbw Catalyst A
0.15 pbw Silicone A
The NCO/OH ratio was 1.2/1.
The following results were observed.

The viscosity of the liquid polyurethane-forming components was 10,000 cp at 30 min.
The coating weight was 47 oz./yd$^2$.
The penetration weight was 7 oz./yd$^2$.
The gauge was 0.279 inches.
The cell count was 26 cells per area.
The foam density was 11.9 lb/ft$^3$.

EXAMPLE 20

The general procedure was followed employing the following composition.
90 pbw Polyol H
10 pbw Polyol B
44 pbw Polyisocyanate B
55 pbw Filler A
0.07 pbw Catalyst A
0.15 pbw Silicone A
The NCO/OH ratio was 1.2/1.
The following results were observed.

The viscosity of the liquid polyurethane-forming components was 10,000 cp at 8 min.
The coating weight was 44 oz./yd$^2$.
The penetration weight was 5.2 oz./yd$^2$.
The gauge was 0.311 inches.
The cell count was 30 cells per area.
The foam density was 10 lb/ft$^3$.
The polyol viscosity was 1455 cp.

EXAMPLE 21

The general procedure was followed employing the following composition.

85 pbw Polyol I
15 pbw Polyol F
166 pbw Polyisocyanate B
55 pbw Filler A
0.09 pbw Catalyst A
0.15 pbw Silicone A
The NCO/OH ratio was 1.2/1.
The following results were observed.

The viscosity of the liquid polyurethane-forming components was 10,000 cp at 12 min.
The coating weight was 47 oz./yd$^2$.
The penetration weight was 8 oz./yd$^2$.
The gauge was 0.353 inches.
The cell count was 18 cells per area.
The foam density was 9.3 lb/ft$^3$.
The polyol viscosity was 2260 cp.

EXAMPLE 22

The general procedure was followed employing the following composition.
100 pbw Polyol A
11.4 pbw Polyisocyanate B
55 pbw Filler A
0.06 pbw Catalyst A
0.15 pbw Silicone A
The NCO/OH ratio was 1.2/1.
The following results were observed.

The viscosity of the liquid polyurethane-forming components was 10,000 cp at 20 min.
The coating weight was 45 oz./yd$^2$.
The penetration weight was 11 oz./yd$^2$.
The gauge was 0.231 inches.
The cell count was 19 cells per area.
The foam density was 12.5 lb/ft$^3$.
The polyol viscosity was 810 cp.

COMPARATIVE EXPERIMENT N

Example 22 was repeated except that no silicone was added with the following results being observed.

Foam totally collapsed.

EXAMPLE 23

The general procedure was followed employing the following composition.
85 pbw Polyol J
15 pbw Polyol F
55 pbw Filler A
108 pbw Polyisocyanate B
0.06 pbw Catalyst B
0.45 pbw Silicone A
The NCO/OH ratio was 1.2/1
The following results were observed.
The viscosity of the liquid polyurethane forming components was 10,000 cp at 9 min.
The coating weight was 46.5 oz./yd$^2$.
The penetration weight was 12 oz./yd$^2$.
The gauge was 0.293 inches.
The cell count was 20 cells per area.
The density was 9.8 lb./ft$^3$.
The viscosity of a mixture of the polyols was 180 cp.

We claim:
1. A process for preparing substrates having a fine celled polyurethane foam backing containing an inorganic filler or mixture of such fillers, which process comprises applying to the back of said substrate and subsequently curing thereon a frothed polyurethane forming composition containing
(A) a relatively high molecular weight polyether polyol having an average of from 2 to about 8, hydroxyl groups per molecule and an average hydroxyl equivalent weight of from about 100 to about 3000 or a mixture of such polyols;
(B) a relatively low molecular weight polyol having an average of from about 2 to about 8 hydroxyl groups per molecule and an average equivalent weight of from about 31 to about 230 or a mixture of such polyols;
(C) an organic polyisocyanate or polyisothiocyanate having an average of from about 2 to about 4 NCX (each X being independently O or S) groups per molecule or a mixture of such isocyanates or isothiocyanates;
(D) at least one inorganic filler;
(E) at least one catalyst for effecting the reaction between components (A), (B) and (C); and
(F) at least one silicone surfactant which is a poly(-dimethyl)siloxane polyoxyalkylene copolymer having an average molecular weight of less than about 30,000 and wherein at least about 60 percent by weight of the polyoxyalkylene groups are oxyethylene groups and the dimethylsiloxane content of the polymer is from about 15 percent to about 40 percent by weight and at least about 40 percent by weight of the polymer is derived from the oxyethylene groups;
wherein:
(1) components (A) and (B) are employed in a ratio which provides from about 50 to about 95 parts by weight of component (A) and from about 50 to about 5 parts by weight of component (B) based on 100 parts by weight for the total quantity of components (A) and (B) with the proviso
(i) that the equivalent weight of (A) is at least 1.5 times greater than the equivalent weight of (B);
(ii) that when component (A) has an average functionality of from 2 to about 8 and an OH equivalent weight of from about 1000 to about 3000 and either (a) an end cap of at least two moles of ethylene oxide per active hydrogen atom or (b) an internal block of at least three moles of ethylene oxide residues per active hydrogen atom, then component (B) need not be present; and
(iii) that a mixture of components (A) and (B) or component (A) when employed alone has a Brookfield viscosity employing a No. 2 spindle at 12 rpm of at least about 100 centipoise at 25° C.;
(2) components (A), (B) and (C) are employed in quantities so as to provide an NCX:OH ratio of from about 0.85:1 to about 2:1,
(3) component (E) is employed such that an unfrothed mixture of the unfilled urethane forming components (A), (B), (C), (E) and (F) obtains a viscosity of greater than about 10,000 centipoise at 25° C.±0.5° C. in less than about 40 minutes; and
(4) component (F) is present in a quantity of from about 0.02 to about 0.5 parts per 100 parts by weight of the combined weight of components (A) and (B) and is of such composition and quantity so as to provide the foam with a cell count of greater than 16 per 0.0025 square inches (0.016 cm$^2$) at a position approximately midway between the sub- strate-foam interface and the outer edge of the foam.

2. A process of claim 1 wherein
(1) component (A) has an average of from about 2 to about 3 hydroxyl groups per molecule and an average equivalent weight of from about 500 to about 2500;
(2) component (B) is present and has an average of from about 2 to about 3 hydroxyl groups per molecule and an average equivalent weight of from about 31 to about 200;
(3) the equivalent weight of polyol component (A) is at least 10 times greater than the equivalent weight of polyol component (B);
(4) the viscosity of a mixture of components (A) and (B) is at least about 250 cp;
(5) component (C) is a polyisocyanate;
(6) in component (F), the average molecular weight of any such copolymer is less than about 10,000;
(7) components (A), (B) and (C) are employed in quantities so as to provide an NCO:OH ratio of from about 1:1 to about 1.2:1.

3. A process of claim 2 wherein component (A) has a functionality of 3; component (B) has a functionality of 2; component (C) is a prepolymer and in component (F), 100 percent of the oxyalkylene groups are oxyethylene groups.

4. A process of claim 3 wherein component (A) is selected from the group consisting of (a) a glycerine initiated polyoxypropylene triol end capped with from about 1.75 to about 2.75 moles of ethylene oxide per hydroxyl group and having an average OH equivalent weight of from about 950 to about 1290, (b) a glycerine initiated polyoxypropylene triol end capped with from about 4.5 to about 8 moles of ethylene oxide per hydroxyl group and having an average OH equivalent weight of from about 1600 to about 1700 and (c) a glycerine initiated polyoxypropylene triol end capped with from about 6 to about 12 moles of ethylene oxide per OH group and having an average OH equivalent weight of from about 2210 to about 2320; component (B) is diethylene glycol; and component (C) is a prepolymer prepared from an 80/20 mixture of 2,4/2,6-toluene diisocycanate and a mixture of a glycerine initiated polyoxypropylene glycol and a polyoxyethylene glycol said prepolymer having an NCO equivalent weight of from about 155 to about 160.

5. A process of claim 4 wherein in component (C) the glycerine initiated polyoxypropylene glycol has an average equivalent weight of about 87 and the polyethylene glycol has an average equivalent weight of about 100.

6. A process of claims 1, 2, 3, 4 or 5 wherein component F is represented by the formula

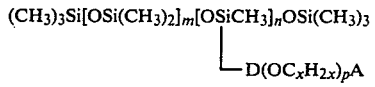

wherein m has a value of from about 6 to about 180, n has a value of from about 3 to about 30, each x is independently 2, 3 or 4 with the proviso that at least 60 percent of the x's have a value of 2; p has a value of from about 9 to about 30; A is selected from the group consisting of

(acyloxy) especially where R is methyl,

(carbonate ester),

(urethane), —OH (hydroxyl), or —R (alkyl); and D is an alkylene radical.

7. A process of claim 6 wherein m has a value of from about 6 to about 60; n has a value of from 3 to about 10; each x has a value of 2; p has a value of from about 9 to about 20; A is acetate, urethane, hydroxyl or methyl; and D is an alkylene radical containing from about 3 to about 18 carbon atoms.

8. A process of claim 7 wherein m has a value of from about 11 to about 20; n has a value of from 3 to about 5; each x has a value of 2; p has a value of from about 9 to about 12; A is acetate, urethane, hydroxyl or methyl; and D is the propylene radical.

9. A process of claims 1, 2, 3, 4 or 5 wherein said substrate is a tufted carpet.

10. A process of claim 6 wherein said substrate is a tufted carpet.

11. A process of claim 7 wherein said substrate is a tufted carpet.

12. A process of claim 8 wherein said substrate is a tufted carpet.

13. A substrate backed with a fine celled polyurethane foam produced by a process of claims 1, 2, 3, 4 or 5.

14. A substrate backed with a fine celled polyurethane foam produced by a process of claim 6.

15. A substrate backed with a fine celled polyurethane foam produced by a process of claim 7.

16. A substrate backed with a fine celled polyurethane foam produced by a process of claim 8.

17. A process for preparing substrates having a fine celled polyurethane foam backing containing an inorganic filler or mixture of such fillers, which process comprises applying to the back of said substrate and subsequently curing thereon a frothed polyurethane forming composition containing
(A) a relatively high molecular weight polyether polyol having an average of from 2 to about 8 hydroxyl groups per molecule and an average hydroxyl equivalent weight of from about 100 to about 3000 or a mixture of such polyols;
(B) a relatively low molecular weight polyol having an average of from about 2 to about 8 hydroxyl groups per molecule and an average equivalent weight of from about 31 to about 230 or a mixture of such polyols;
(C) an organic polyisocyanate or polyisothio cyanate having an average of from about 20 to about 4 NCX (each X being independently O or S) groups per molecule or a mixture of such isocyanates or isothiocyanates;
(D) at least one inorganic filler;

(E) at least one catalyst for effecting the reaction between components (A), (B) and (C); and (F) at least one silicone surfactant which is a branched organosilicon polyglycol block copolymer having an average molecular weight below about 30,000;

wherein:

(1) components (A) and (B) are employed in a ratio which provides from about 50 to about 95 parts by weight of component (A) and from about 50 to about 5 parts by weight of component (B) based on 100 parts by weight for the total quantity of components (A) and (B) with the proviso (i) that the equivalent weight of (A) is at least 1.5 times greater than the equivalent weight of (B);

(ii) that when component (A) has an average functionality of from 2 to about 8 and an OH equivalent weight of from about 1000 to about 3000 and either (a) an end cap of at least two moles of ethylene oxide per active hydrogen atom or (b) an internal block of at least three moles of ethylene oxide residues per active hydrogen atom, then component (B) need not be present; and (iii) that a mixture of components (A) and (B) or component (A) when employed alone has a Brookfield viscosity employing a No. 2 spindle at 12 rpm of at least about 100 centipoise at 25° C.;

(2) components (A), (B) and (C) are employed in quantities so as to provide an NCX:OH ratio of from about 0.85:1 to about 2:1, (3) component (E) is employed such that an unfrothed mixture of the unfilled urethane forming components (A), (B), (C), (E) and (F) obtains a viscosity of greater than about 10,000 centipoise at 25° C.±0.5° C. in less than about 40 minutes; and (4) component (F) is present in a quantity of from about 0.02 to about 0.5 parts per 100 parts by weight of the combined weight of components (A) and (B) and is of such composition and quantity so as to provide the foam with a cell count of greater than 16 per 0.0025 square inches (0.016 cm$^2$) at a position approximately midway between the substrate-foam interface and the outer edge of the foam.

18. A process of claim 17 wherein (1) component (A) has an average of from about 2 to about 3 hydroxyl groups per molecule and an average equivalent weight of from about 500 to about 2500;

(2) component (B) is present and has an average of from about 2 to about 3 hydroxyl groups per molecule and an average equivalent weight of from about 31 to about 200;

(3) the equivalent weight of polyol component (A) is at least 10 times greater than the equivalent weight of polyol component (B);

(4) the viscosity of a mixture of components (A) and (B) is at least about 250 cp;

(5) component (C) is a polyisocyanate; and (6) components (A), (B) and (C) are employed in quantities so as to provide an NCO:OH ratio of from about 1:1 to about 1.2:1.

19. A process of claim 18 wherein component (A) has a functionality of 3; component (B) has a functionality of 2; and component (C) is a prepolymer.

20. A process of claim 19 wherein component (A) is selected from the group consisting of (a) a glycerine initiated polyoxypropylene triol end capped with from about 1.75 to about 2.75 moles of ethylene oxide per hydroxyl group and having an average OH equivalent weight of from about 950 to about 1290, (b) a glycerine initiated polyoxypropylene triol end capped with from about 4.5 to about 8 moles of ethylene oxide per hydroxyl group and having an average OH equivalent weight of from about 1600 to about 1700 and (c) a glycerine initiated polyoxypropylene triol end capped with from about 6 to about 12 moles of ethylene oxide per OH group and having an average OH equivalent weight of from about 2210 to about 2320; component (B) is diethylene glycol; and component (C) is a prepolymer prepared from an 80/20 mixture of 2,4-/2,6-toluene diisocycanate and a mixture of a glycerine initiated polyoxypropylene glycol and a polyoxyethylene glycol said prepolymer having an NCO equivalent weight of from about 155 to about 160.

21. A process of claim 20 wherein in component (C) the glycerine initiated polyoxypropylene glycol has an average equivalent weight of about 87 and the polyethylene glycol has an average equivalent weight of about 100.

22. A process of claims 17, 18, 19, 20 or 21 wherein said substrate is a tufted carpet.

23. A substrate backed with a fine celled polyurethane foam produced by a process of claims 17, 18, 19, 20 or 21.

24. A foam backed carpet prepared by a process of claim 22.

* * * * *